(12) United States Patent
Ye et al.

(10) Patent No.: US 8,239,591 B2
(45) Date of Patent: *Aug. 7, 2012

(54) METHOD FOR PRODUCING A MAPPING TOOL, A GAME PROGRAM HAVING THE MAPPING TOOL AND OPERATION METHOD THEREOF

(76) Inventors: Zhou Ye, Foster City, CA (US);
Shun-Nan Liou, Kaohsiung (TW);
Ying-Ko Lu, Taoyuan County (TW);
Ching-Lin Hsieh, Taoyuan County (TW)

( * ) Notice: Subject to any disclaimer, the term of this patent is extended or adjusted under 35 U.S.C. 154(b) by 9 days.

This patent is subject to a terminal disclaimer.

(21) Appl. No.: 13/183,419

(22) Filed: Jul. 14, 2011

(65) Prior Publication Data

US 2011/0271018 A1 Nov. 3, 2011

Related U.S. Application Data

(63) Continuation of application No. 12/314,624, filed on Dec. 15, 2008, now Pat. No. 8,041,860.

(51) Int. Cl.
*G06F 13/38* (2006.01)
*G06F 13/00* (2006.01)

(52) U.S. Cl. .............................. 710/62; 463/36; 345/163
(58) Field of Classification Search .............. 710/36–38, 710/62–67; 715/762; 463/36–39; 345/163
See application file for complete search history.

(56) References Cited

U.S. PATENT DOCUMENTS
2010/0153596 A1* 6/2010 Ye .................................... 710/67
* cited by examiner

*Primary Examiner* — Christopher B Shin
(74) *Attorney, Agent, or Firm* — Ding Yu Tan

(57) ABSTRACT

A method for producing a mapping tool, a video game system for a stand-alone computer having the mapping tool and operation method thereof is disclosed. The mapping tool is created by means of linking a remote motion signal generated from a remote device which is operated by user with an input source signal from a conventional input source motion mapping table. User may operate the video game system for the stand-alone computer through the mapping tool. The present invention employs the mapping tool to replace conventional input source motion mapping table, thereby providing natural ergonomic and consistent usage of existing PC games or games for stand-alone computer having the input source motion mapping table.

16 Claims, 6 Drawing Sheets

METHOD FOR PRODUCING A MAPPING TOOL, A GAME PROGRAM HAVING THE MAPPING TOOL AND OPERATION METHOD THEREOF

CROSS-REFERENCE TO RELATED APPLICATIONS

This application is a continuation of an U.S. application Ser. No. 12/314,624, filed on Dec. 15, 2008, now U.S. Pat. No. 8,041,860, and this application having at least one inventor in common, namely, Zhou Ye. The contents of the above-mentioned patent application is hereby incorporated by reference herein in its entirety and made a part of this specification.

FIELD OF THE INVENTION

The present invention relates to a method for producing a mapping tool, a video game for a stand-alone computer having the mapping tool and operation method thereof; in particular, to a system and method which replaces conventional input source mapping table by the mapping tool, and uses the remote signal generated by a remote device to operate conjunctively with the mapping tool to control a video game for stand-alone computer.

BACKGROUND OF THE INVENTION

In human daily lives, among activities for recreation and entertainment, video game sites are widely favored by people, and there in such sites usually place various types of video games to allow people to play. Recently, thanks to rapid development and advancement of computer industry, many video games originally designed for large video game machines have been transplanted to stand-alone computers, commonly referred as PC games.

When the computer industry arose, many game design companies veered to design many popular PC games or video games for stand-alone computer. In order to match the computer peripheral input devices, all actions of each character in a PC game needs to receive the signal transferred by the computer peripheral input devices. Taking the keyboard and direction keys as the computer peripheral input device for example, it may be like that: jump up motion is represented by the Up key (↑) on the keyboard, jump down motion indicated by the Down key (↓), forward motion by the Left key (←) and backward motion by the Right key (→). All motions of each character of the PC game have been programmed by the game design company as a keyboard motion mapping table in advance and stored in the PC game; when a user plays the aforementioned PC game and operates the direction keys on the keyboard, the PC game can understand the motion instructed by the user through the above-said keyboard motion mapping table, thereby generating corresponding actions.

However, the said scheme for PC game design may cause the following drawbacks:

1. although such a PC game design approach may satisfy computer industry's needs, it does not fit human ergonomics, probably inducing injuries or negative influences on user's fingers;

2. such a PC game design approach may at last lead to the competitions in speed between the user's control and the computation of PC operations, totally losing the effects of recreational activities;

3. the above-mentioned input devices of the PC game are limited to the keyboard or mouse, so that the user can only play the PC game within a certain restricted space, as a result the extent of entertainment has been significantly reduced.

Commonly known conventional input sources or input devices designed for computer video games available in the current market place includes examples such as keyboard, computer mouse, joystick, steering wheel controller or gamepad, etc. Referring to US patent publication no. 20090048021, paragraphs [0003] to [0005] describes a plurality of conventional input interfaces, such as keyboard, joystick, or mouse to be used as the control device for most multimedia games. Furthermore, this reference also describes other conventional input devices such as for example, trackball, touch pad, and game controllers as being still used as control device. Referring also to [0003] of U.S. Pat. No. 7,319,458, it is common for a computer game to employ certain computer peripherals, such as keyboard, mouse, joystick and gamepad, etc., as controlling device of the game. According to "The Computer Controller Cookbook" of Atari-archives.org, published in 1983, a conventional race car steering wheel controller designed for PC game is also described in detail. According to Jan. 7, 2007 article from Engadget-.com titled "Microsoft announces the HP TouchSmart PC", a desktop machine with a touchscreen interface designed to be used as an entertainment hub in the home is made by HP and available to the public.

Accordingly, the disclosure for the present invention presented herein have considered the improvable defects illustrated hereinbefore, particularly devoted to the relevant development and, in conjunction with theoretical applications and expertise, proposed the present invention of reasonable design which provides effectiveness in resolving the aforementioned issues.

SUMMARY OF THE INVENTION

An objective of the present invention is to provide a method for producing a mapping tool, a PC game or a video game for a stand-alone computer having the mapping tool and operation method thereof, which system and operation method allowing to use a remote device to output at least one remote motion signal, resolve the at least one remote motion signal to create a mapping tool, replace the conventional keyboard motion mapping table or the conventional input source motion mapping table by the newly-created mapping tool, and use the remote device in conjunction with the mapping tool to control the PC game or the video game for the stand-alone computer.

To achieve the above-said objective, the present invention provides a method for producing a mapping tool, comprising creating a remote motion database having a plurality of remote motions; reading a keyboard motion mapping table; resolving a plurality of keyboard commands and a plurality of motion commands included in the keyboard motion mapping table; searching for the corresponding remote motion commands based on such motion commands; and linking such remote motion commands with such keyboard commands to produce the mapping tool. In addition, the present invention also provides a method for producing a mapping tool, comprising of creating a remote motion database having a plurality of remote motions; reading an input source motion mapping table; resolving a plurality of input source commands and a plurality of motion commands included in the input source motion mapping table; searching for the corresponding remote motion commands based on such motion commands; and linking such remote motion commands with such input source commands to produce the mapping tool.

To achieve the above-said objective, the present invention provides a PC game system having the mapping tool, comprising a host, having a wireless reception device and at least one PC game; a remote device, generating a remote motion signal and transmitting it to the wireless reception device; and a mapping tool, including a remote motion resolution section and a remote motion mapping table, the remote motion resolution section being used to resolve the remote motion signal, and to generate the remote motion mapping table based on the results of the resolution, in which the remote device controls the PC game in accordance with the remote motion mapping table. Alternatively, the PC game system can be a game system for a stand-alone computer.

To achieve the above-said objective, the present invention provides a game operation method using the mapping tool of the embodiments of the present invention, comprising loading at least one PC game having a keyboard motion mapping table or an input source motion mapping table; installing a mapping tool; receiving at least one remote motion signal; resolving such remote motion signals through the mapping tool; separating at least one keyboard key signal or one input source signal in the keyboard motion mapping table or the input source motion mapping table by means of the mapping tool; linking such remote motion signals with such keyboard key signals or such input source command signals; and operating the PC games using the mapping tool.

The present invention provides at least the following beneficial effects:

1. the user, during PC game operations, may be exempted from the limitation of keyboard or input source, better conforming to humanized operation condition and achieving the goal of natural ergonomics, without causing injuries or negative influences on specific portions of user's body (e.g. fingers). It is also possible to enhance the effect of entertainment by exploiting the features of the mapping tool;

2. the game design company needs not to abandon popular PC games or video games for stand-alone computers developed in earlier days, the user can still play the existing PC game or video game for stand-alone computer through the mapping tool; hence, the game design company is able to significantly reduce the cost of game development.

In order to facilitate further understanding of the characteristics and technical contents of the present invention, references are made to the detailed descriptions and appended drawings of the present invention; however, the appended drawings are simply referential and illustrative, rather than being used to limit the scope of present invention thereto.

DETAILED DESCRIPTION OF PREFERRED EMBODIMENTS

In order to work with computer peripheral device, the design of PC games at early stage mostly used a keyboard or mouse as the input source; therefore, a keyboard motion mapping table is designed by software programming in each PC game, in which the keyboard motion mapping table records the correspondence between each motion command of the PC game and any key command on a keyboard. The purpose of the keyboard motion mapping table is to allow the PC game to be able to resolve the motion command issued by the user through a specific key, and then, using the keyboard motion mapping table, to facilitate execution of corresponding motions to the PC game. For example, jump up motion is represented by the Up key (↑) on the keyboard, jump down motion indicated by the Down key (↓), forward motion by the Left key (←) and backward motion by the Right key (→).

Alternatively, an input source motion mapping table is designed by software programming in each PC game, in which the input source motion mapping table records the correspondence between each input source command of the PC game and any input source command on the input source. The input source is, for example, a keyboard, computer mouse, joystick, steering wheel controller, touch screen, or gamepad.

However, as the drawbacks caused by the keyboard motion mapping table in the prior art set forth hereinbefore, this may largely weaken the entertaining effect created by existing PC games. Besides, since people's demands may increase and health-care issues may become noticeable in the future, long-term use of the PC game employing existing keyboard motion mapping table or input source motion mapping table by the user can result in specific injuries to user's body (e.g. fingers), so conventional PC games using the keyboard motion mapping table or input source motion mapping table will inevitably vanish on the market gradually.

In order to allow existing popular PC games to survive on the current market, the present invention provides a new mapping tool to substitute the conventional keyboard motion mapping table or input source motion mapping table, and the mapping tool according to the embodiments of the present invention can also get rid of limitation in keyboard or input source using a remote device as the input device.

Figure 1A:
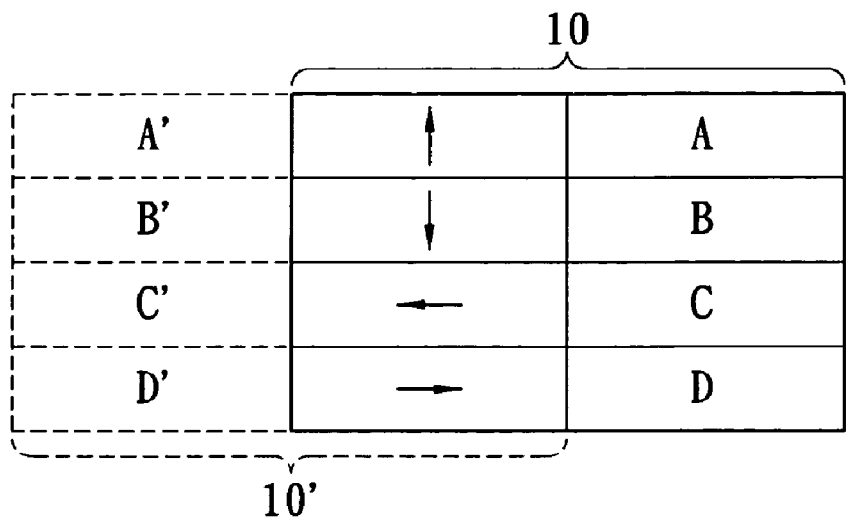
FIG. 1A shows a diagram for a mapping tool according to an embodiment of the present invention.
Figure 1B:
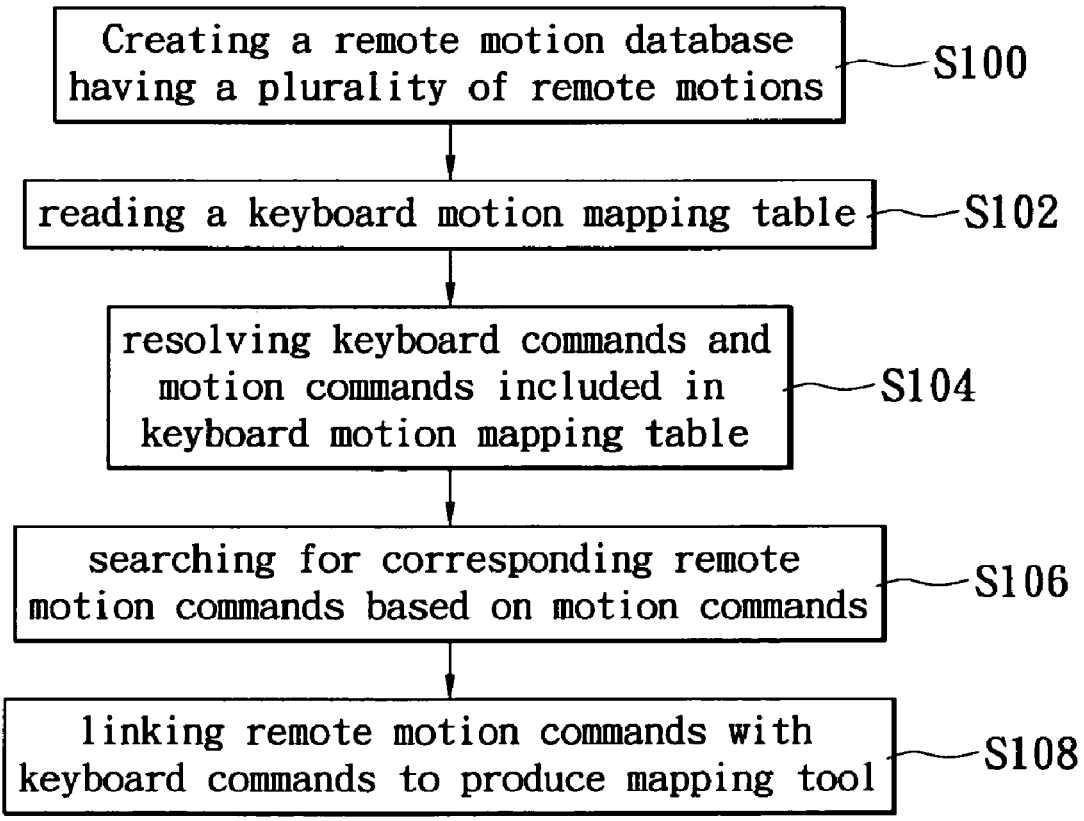
FIG. 1B shows a flowchart for a method of producing the mapping tool according to the embodiment of the present invention.

Refer conjunctively to FIGS. 1A and 1B, wherein FIG. 1A shows a diagram for a mapping tool according to an embodiment of the present invention, and FIG. 1B shows a flowchart for a method of producing the mapping tool according to the embodiment of present invention. In implementation, the mapping tool set forth hereinafter may be a software application.

In FIG. 1A, a mapping tool 10' is linked with an original keyboard motion mapping table 10, in which the Up key (↑), Down key (↓), Left key (←) and Right key (→) each represents respective direction key on the keyboard, while the alphabets A, A' indicate jump up motions, the alphabets B, B' indicate jump down motions, the alphabets C, C' indicate forward motions and the alphabets D, D' are for backward motions. Each motion in the mapping tool 10' according to the embodiment of present invention is not instructed by the keyboard, but enabled by a remote motion signal generated by an external remote device, and then the key press signal on the keyboard is simulated based on the generated remote motion signal so as to replace the effect of the keyboard motion mapping table 10, further using the remote motion signal to control the PC game. Details of the method for producing the mapping tool 10' according to the embodiment of present invention can be shown as FIG. 1B, and will be explained infra.

In the method shown as FIG. 1B, it generates a plurality of remote motion commands with an external remote device, and creates a remote motion database including the remote motion commands based on the remote motion commands (S100), wherein such remote motion commands may be motions such as, but not limited thereto, swing up, swing down, swing left, swing right, circling, swing upper right to lower left, swing upper left to lower right, stab forward or retract backward, then the mapping tool 10' determines on each remote motion command to define an actual motion. Next, it reads the keyboard motion mapping table 10 (S102) to further resolve the plurality of keyboard commands and plurality of motion commands in the keyboard motion mapping table 10 (S104); upon completion of the resolution, the mapping tool 10' appreciates the correspondence between the keyboard commands in the keyboard motion mapping table 10 and the motion commands. Subsequently, the mapping tool 10' searches for the corresponding remote motion command based on the motion command (S106), and when the corresponding remote motion command being searched is located, the mapping tool 10' links the remote motion command with the keyboard command included in the keyboard motion mapping table 10; as the linking operation is done, the production of the mapping tool 10' is completed (S108).

Figure 2A:
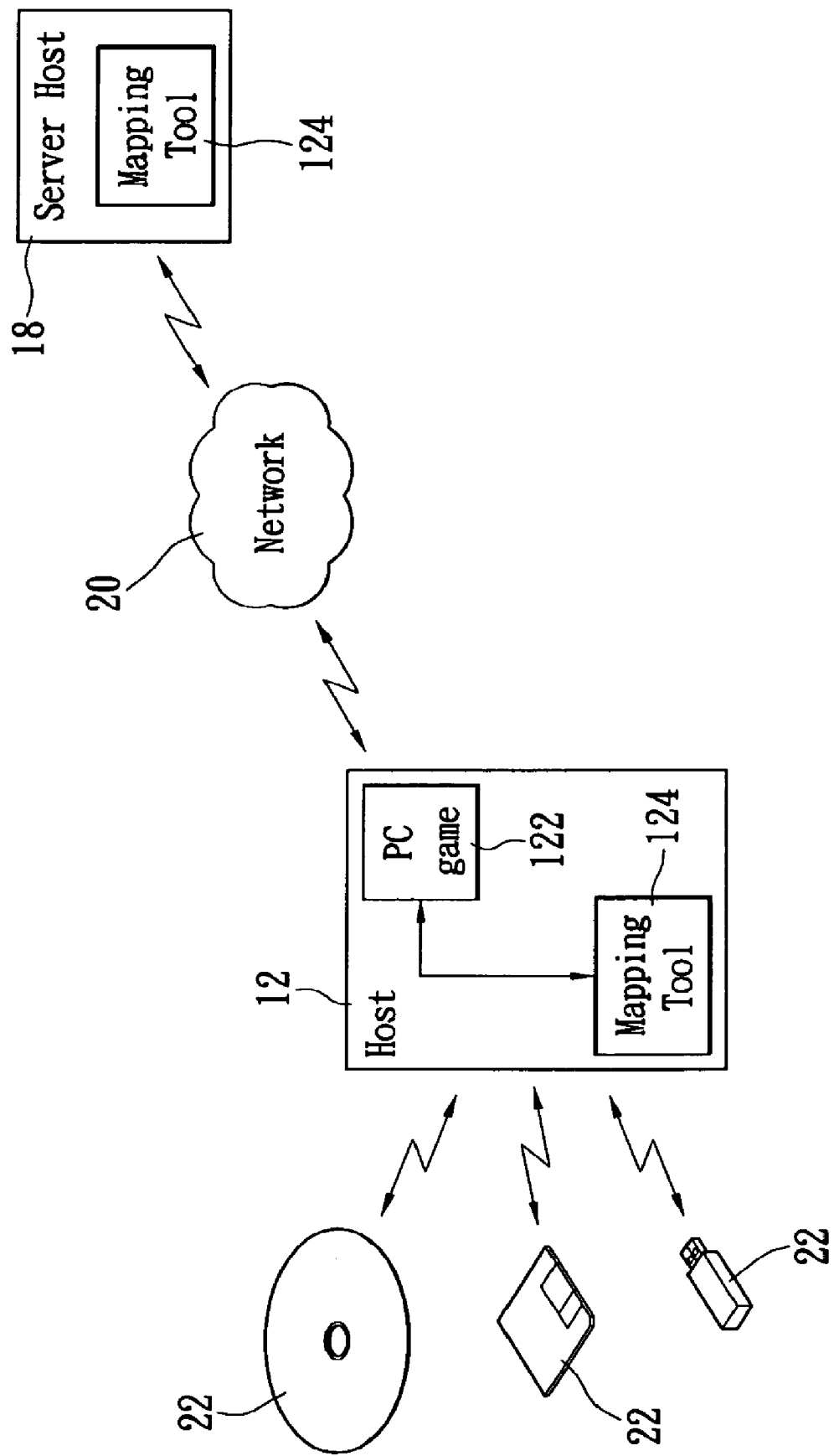
FIG. 2A shows a diagram for the architecture of a PC game system having the mapping tool according to the embodiment of the present invention.
Figure 2B:
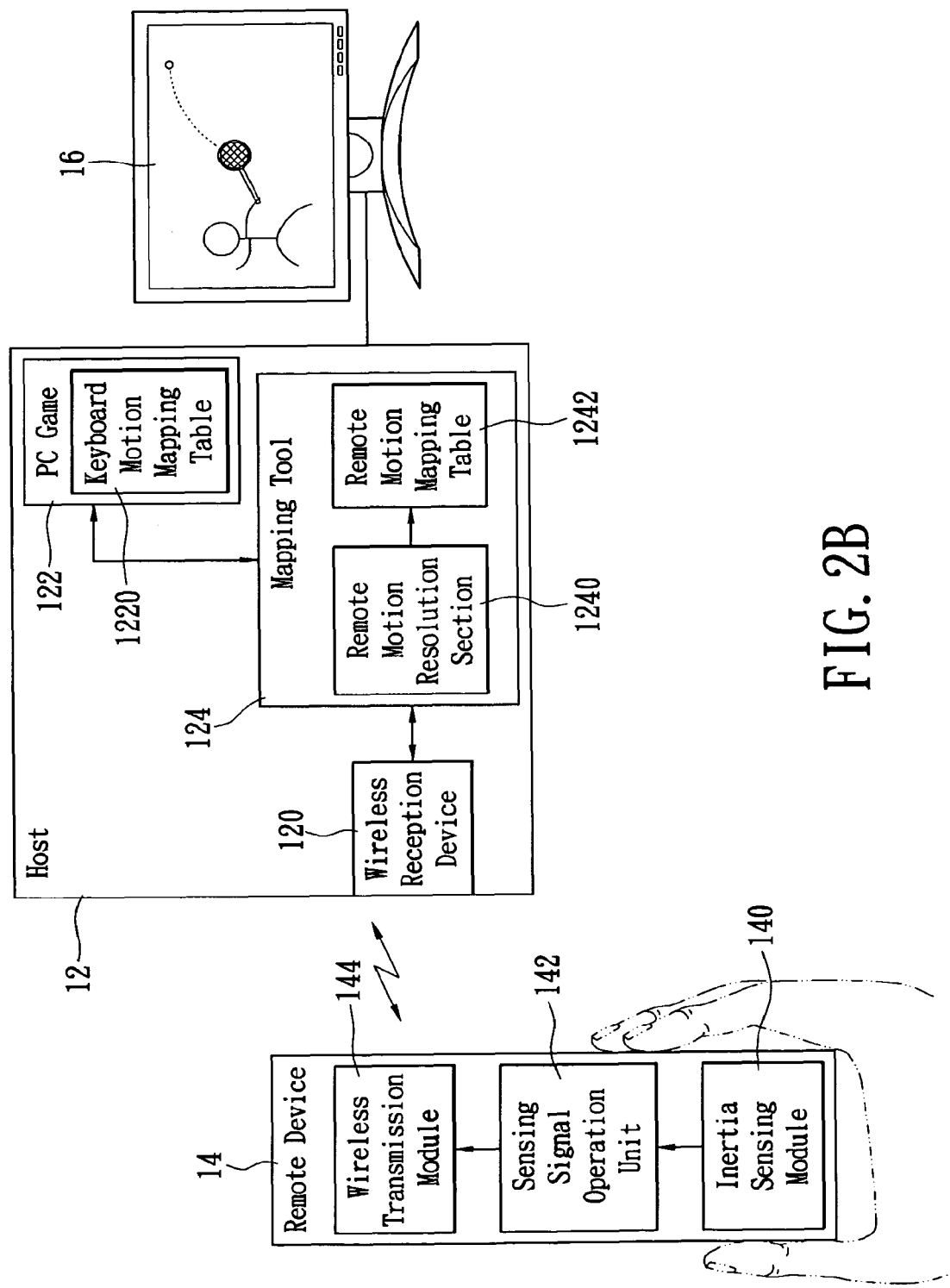
FIG. 2B shows a diagram for the embodiment of the PC game system having the mapping tool according to the embodiment of the present invention.

Refer now conjunctively to FIGS. 2A and 2B, wherein FIG. 2A shows a diagram for the architecture of a PC game system having the mapping tool according to the embodiment of the present invention, and FIG. 2B shows a diagram for a PC game system having the mapping tool according to the embodiment of present invention. As shown in FIG. 2B, the system comprises a host 12, a remote device 14, a mapping tool 124 and a screen 16. The host 12 can be a desktop computer, and includes a wireless reception device 120, a mapping tool 124 and at least one PC game 122. The wireless reception device 120 can be a wireless receiver used to receive the remote motion signal transmitted from the remote device 14, and the wireless reception device 120 can employ various types of connection interfaces to connect to the host 12, and such connection interfaces may be a USB interface, IEEE interface or RS-232 interface. The PC game 122 has a keyboard motion mapping table 1220, the keyboard motion mapping table 1220 recording the correspondence between each motion command of the PC game and any key command pressed on a keyboard. The mapping tool 124 includes a remote motion resolution section 1240 and a remote motion mapping table 1242, the remote motion resolution section 1240 being used to resolve the remote motion signal and generating the remote motion mapping table 1242 based on the result of the resolution; meanwhile, the remote device 14 controls the PC game 122 through the remote motion mapping table 1242 and displays the control result on the screen 16.

As shown in FIG. 2A, the mapping tool 124 can be loaded in the host 12 by at least two fashions. The first approach is to download the mapping tool 124 included in the server host 18 to the host 12 via the network 20, and the second way is to, with a recordable media 22, transfer the mapping tool 124 included in the recordable media 22 to the host 12 by manual loading. The said recordable media 22 may be a Compact Disk (CD), a floppy disc or a USB thumb drive.

The remote device 14 is used to generate a remote motion signal and transmit it to the wireless reception device 120. The remote device 14 includes an inertia sensing module 140, a sensing signal operation unit 142 and a wireless transmission module 144. The inertia sensing module 140 can sense the acceleration and angular speed of the remote motion that the user performs through the remote device 14 along X axis, Y axis and Z axis and accordingly generates a signal; in the present embodiment, the remote device 14 is held in hand by the user. The inertia sensing module 140 includes at least one accelerometer or at least one gyroscope. The sensing signal operation unit 142 is used to receive the acceleration and angular speed of the remote motion generated by the inertia sensing module 140, and generates the remote motion signal indicating the acceleration and angular speed of the remote motion through computation; the wireless transmission module 144 receives the remote motion signal generated by the sensing signal operation unit 142, further transmitting such a remote motion signal to the wireless reception device 120 wirelessly (e.g. Bluetooth™, Radio Frequency)

Figure 3:
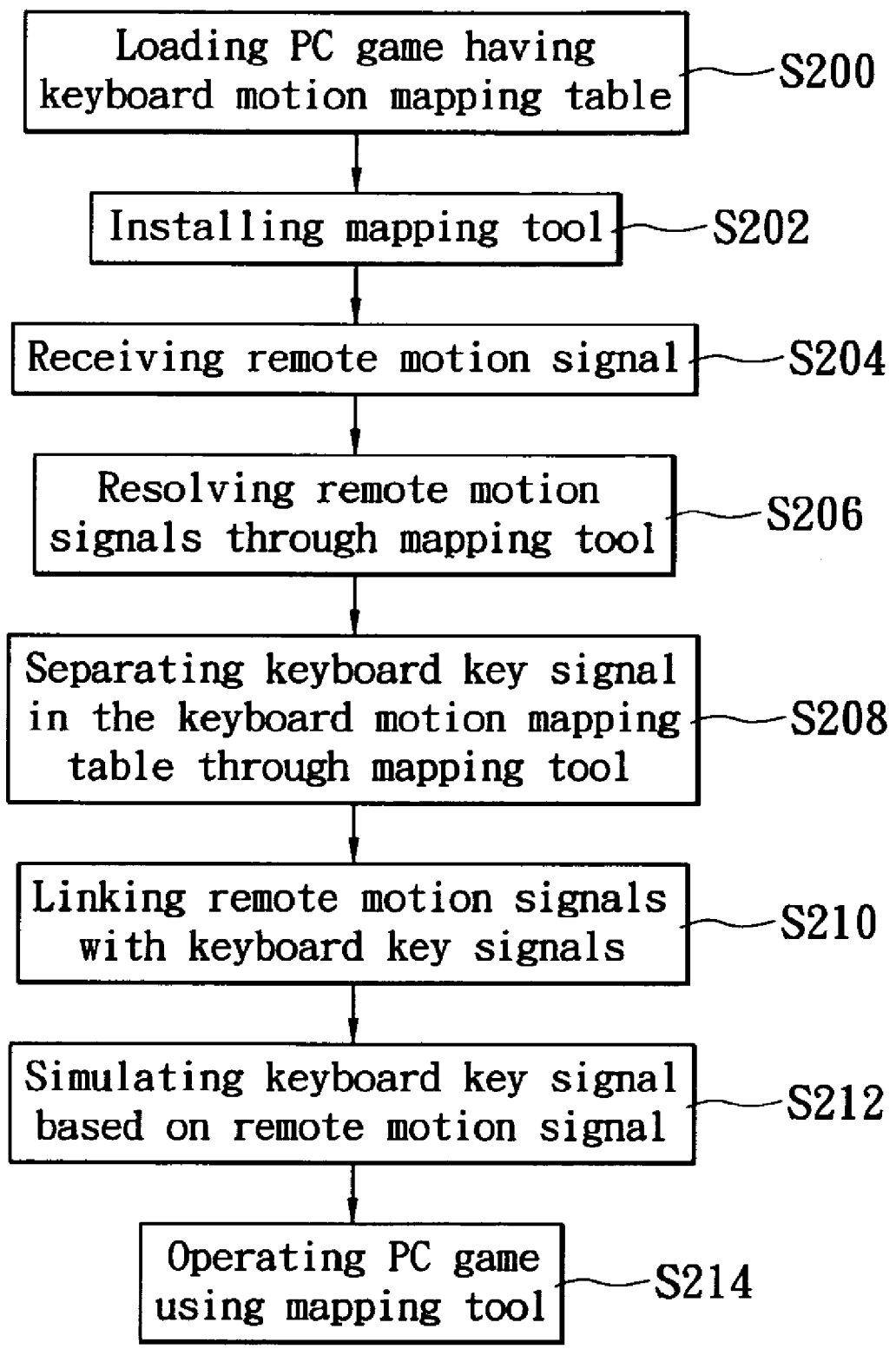
FIG. 3 shows a flowchart for an operation method of a game using the mapping tool according to the embodiment of present invention.

Refer now conjunctively FIGS. 2A, 2B and 3, wherein FIG. 3 shows a flowchart for the operation method of a PC game using the mapping tool 124 according to the embodiment of present invention. Initially, the user first loads in at least one PC game containing the keyboard motion mapping table 1220 (S200), the keyboard motion mapping table 1220 recording the correspondence between each motion command of the PC game and any key command pressed on a keyboard. The PC game 122 may be an action game, a heuristic game, an adventure game, a shooting game, a simulation game, a sport game or a strategic game, shown on the screen 16 of FIG. 2A as a tennis sport game. Next, it installs the mapping tool 124 into the host 12 (S202), the mapping tool 124 comprising a remote motion resolution section 1240 and a remote motion mapping table 1242. The mapping tool 124 can be installed in two ways; the first approach is to download the mapping tool 124 included in the server host 18 to the host 12 via the network 20 and then install it, and the second way is to, with a recordable media 22 (e.g. a Compact Disk (CD), a floppy disc or a USB thumb drive), install the mapping tool 124 stored therein into the host 12.

The wireless reception device 120 of the host 12 receives the remote motion signal transmitted by the remote device 14 (S204), the remote motion signal being the signal generated by the acceleration and angular speed of the remote motion that the user performs through the remote device 14 along X axis, Y axis and Z axis, and the remote motion resolution section 1240 of the mapping tool 124 receives the remote motion signal transmitted by the wireless reception device 120, then the remote motion resolution section 1240 resolve the received remote motion signal (S206). The remote motion resolution section 1240 can be a motion algorithm which resolves the meaning of the remote motion signal based on the rules defined in the motion algorithm, and creates a remote motion database with each of the resolved remote motion signal, in which the remote motion database can be defined beforehand. The mapping tool 124 next separates the motion command and keyboard key command included in the keyboard motion mapping table 1220 to acquire the keyboard key command (S208), and the mapping tool 124 links the resolved remote motion signal stored in the remote motion database with the separated keyboard key command of the keyboard motion mapping table 1220 (S210); upon completion of such a linkage, the production of the remote motion mapping table 1242 is done. The mapping tool 124 simulates the keyboard key signal based on the remote motion signal through the remote motion mapping table 1242 (S212), and at this moment, the user can now operate the PC game using the mapping tool 124 (S214).

Figure 4:
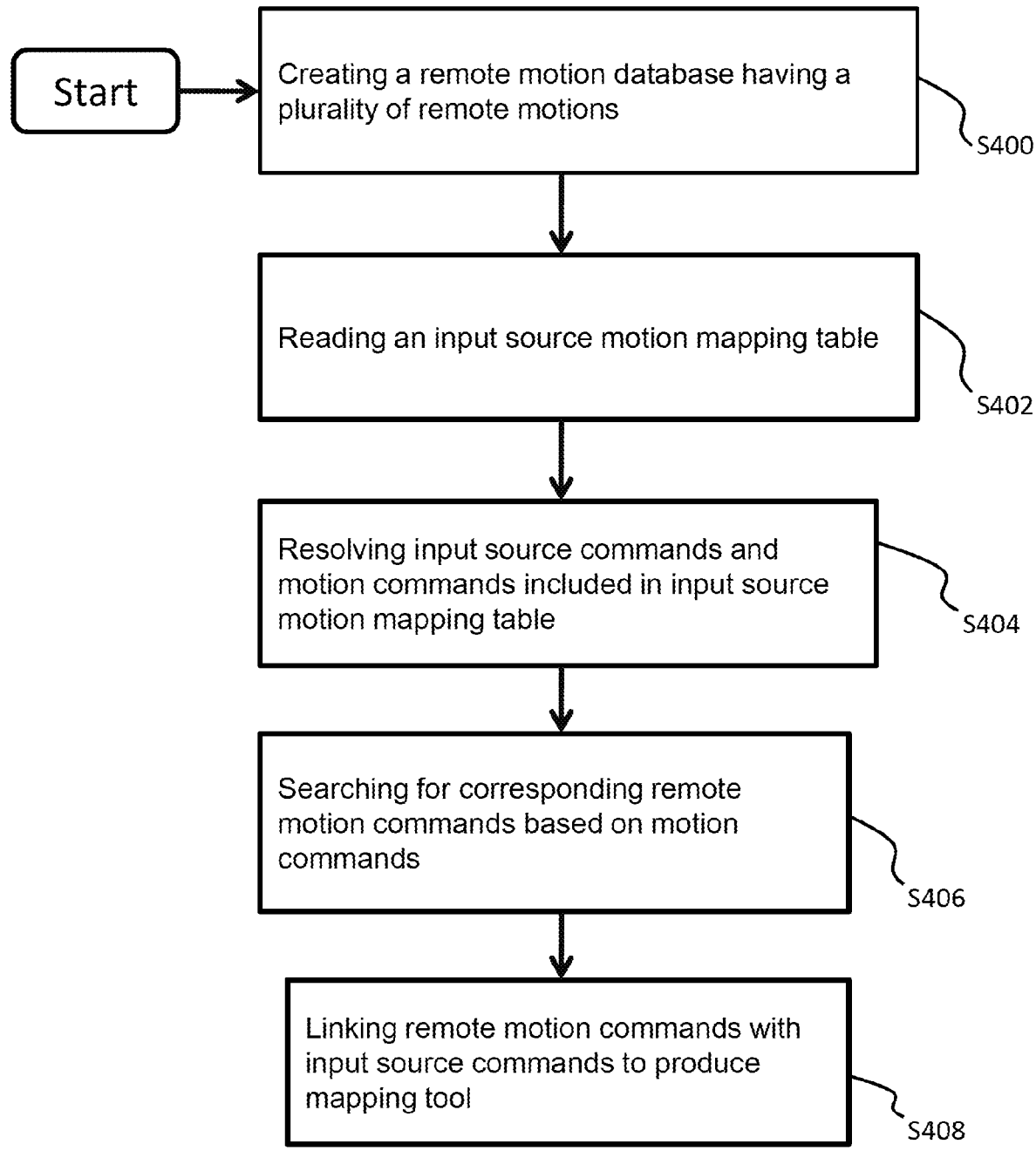
FIG. 4 shows a flowchart for a method of producing a mapping tool according to another embodiment of the present invention.

In the method shown in FIG. 4 according to another embodiment of the present invention, it generates a plurality of remote motion commands with an external remote device, and creates a remote motion database comprising of the remote motion commands based on the remote motion commands (S400), in which such remote motion commands may be motions such as, but not limited thereto, swing up, swing down, swing left, swing right, circling, swing upper right to lower left, swing upper left to lower right, stab forward or retract backward, then the mapping tool 40' determines on each remote motion command to define an actual motion. Next, it reads the input source motion mapping table 40 (S402) to further resolve the plurality of input source commands and the plurality of motion commands in the input source motion mapping table 40 (S404); upon completion of the resolution, the mapping tool 40' appreciates the correspondence between the input source commands in the input source motion mapping table 40 and the motion commands. Subsequently, the mapping tool 40' searches for the corresponding remote motion command based on the motion command (S406), and when the corresponding remote motion command being searched is located, the mapping tool 40' links the remote motion command with the input source command included in the input source motion mapping table 40; as the linking operation is done, the production of the mapping tool 40' is completed (S408).

Figure 5:
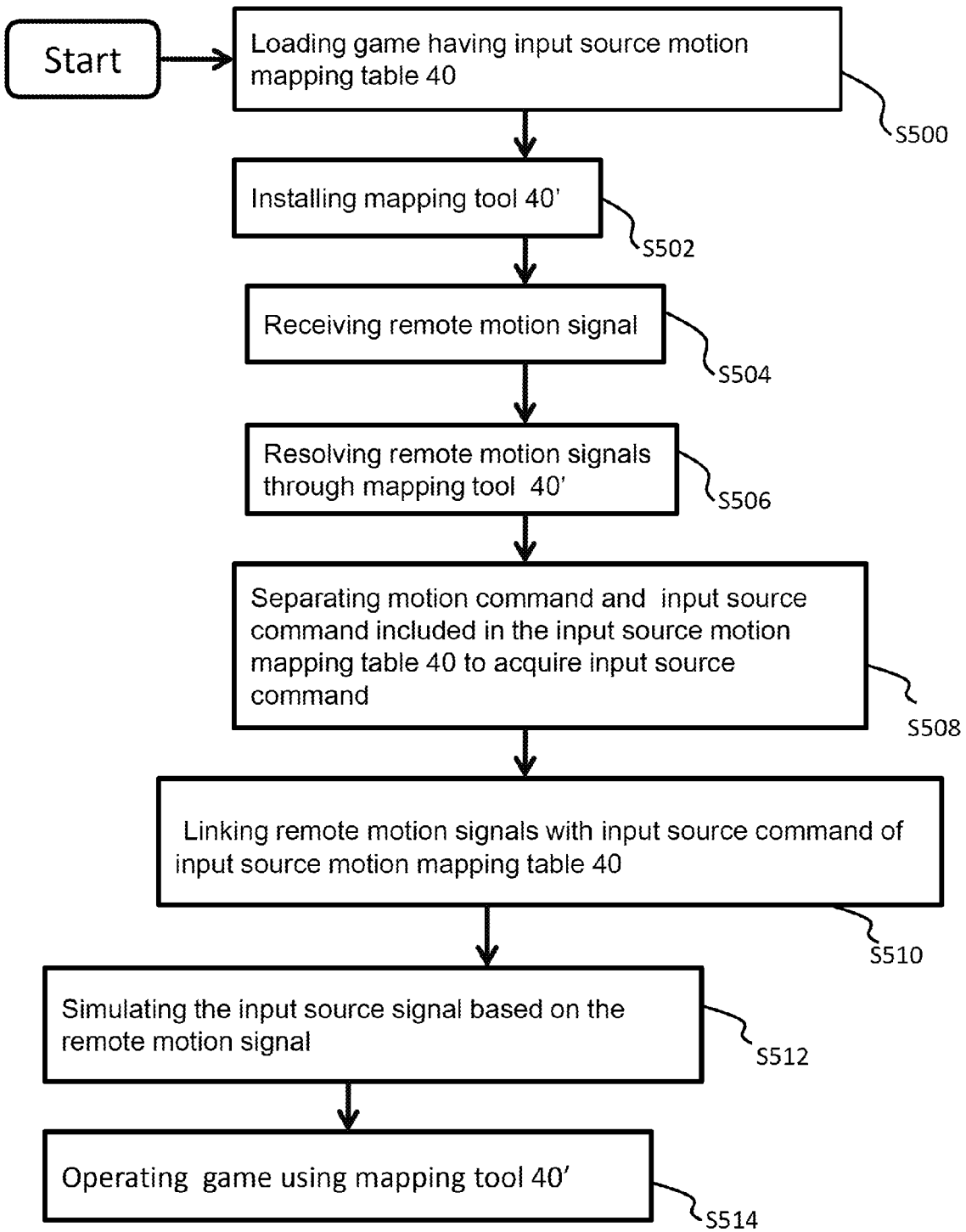
FIG. 5 shows a flowchart for an operation method of a game using the mapping tool according to the another embodiment of present invention.

Refer to FIG. 5, which shows a flowchart for an operation method of a game using the mapping tool 40' according to the another embodiment of the present invention. Initially, the user first loads in at least one game containing the input source motion mapping table 40 (S500), the input source motion mapping table 40 recording the correspondence between each motion command of the game and any input source command pressed or actuated on an input source. The game may be an action game, a heuristic game, an adventure game, a shooting game, a simulation game, a sport game or a strategic game, shown on the screen 16 of FIG. 2A as a tennis sport game. Next, it installs the mapping tool 40' into the host 12 (S502), the mapping tool 40' comprising a remote motion resolution section 1240 and a remote motion mapping table 1242. The mapping tool 40' can be installed in two ways; the first approach is to download the mapping tool 40' included in the server host 18 to the host 12 via the network 20 and then install it, and the second way is to, with a recordable media 22 (e.g. a Compact Disk (CD), a floppy disc or a USB thumb drive), install the mapping tool 40' stored therein into the host 12.

The wireless reception device 120 of the host 12 receives the remote motion signal transmitted by the remote device 14 (S504), the remote motion signal being the signal generated by the acceleration and angular speed of the remote motion that the user performs through the remote device 14 along X axis, Y axis and Z axis, and the remote motion resolution section 1240 of the mapping tool 40' receives the remote motion signal transmitted by the wireless reception device 120, then the remote motion resolution section 1240 resolve the received remote motion signal (S506). The remote motion resolution section 1240 can be a motion algorithm which resolves the meaning of the remote motion signal based on the rules defined in the motion algorithm, and creates a remote motion database with each of the resolved remote motion signal, in which the remote motion database can be defined beforehand. The mapping tool 40' next separates the motion command and the input source command included in the input source motion mapping table 40 to acquire the input source command (S508), and the mapping tool 40' links the resolved remote motion signal stored in the remote motion database with the separated input source command of the input source motion mapping table 40 (S510); upon completion of such a linkage, the production of the remote motion mapping table 1242 is done. The mapping tool 40' simulates the input source signal based on the remote motion signal through the remote motion mapping table 1242 (S512), and at this moment, the user can now operate the game using the mapping tool 40' (S514).

Referring back to FIGS. 2A and 2B, as similar to the architecture of the PC game system having the mapping tool of the embodiment of the present invention, a game system for a stand-alone computer having the mapping tool according to the another embodiment of the present invention can also be similarly configured as shown in FIGS. 2A and 2B, and instead of having the PC game 122, a game for stand-alone computer can be used, instead of having the keyboard motion mapping table 1220, an input source motion mapping table 40 can be used, and instead of having key commands pressed on a keyboard, other input source commands can be inputted on various input sources such as, for example, a keyboard, computer mouse, joystick, steering wheel controller, touch screen or gamepad.

The mapping tool 124 according to the embodiment of the present invention can replace the conventional keyboard motion mapping table 1220. It senses the acceleration and angular speed generated by the user's body with the inertia sensing module 140 of the remote device 14, thereby creating signals indicating motion states of the user's body such as rotation, rhyme, swing or force, then transmitting wirelessly the generated remote state signal to the host 12; in this way, it is possible to provide the feature of high sensitivity, thus satisfying the demand for real-time control. Through the resolution on the remote state signal performed by the remote motion resolution section 1240 of the mapping tool 124 and then using the mapping tool 124 to operate the PC game, it allows the present invention to meet the requirement for real-time operation of high sensitivity.

The present invention provides at least the following beneficial effects:

1. the user, during game operations, may be exempted from the limitation of keyboard or input source, better conforming to humanized operation condition and achieving the goal of natural ergonomics, without causing injuries or negative influences on specific portions of user's body (e.g. fingers). It is also possible to enhance the effect of entertainment by exploiting the features of the mapping tool;

2. the video game design company needs not to abandon popular PC games developed in earlier days, users can still play the existing PC game or video game for stand-alone computer through the mapping tool; hence, the game design company is able to significantly reduce the cost of game development.

The aforementioned descriptions simply set forth the preferred embodiments of the present invention, rather than limiting the scope of the present invention thereto. It is noted that all effectively equivalent technical modifications and changes made in accordance with the disclosure of the present invention and appended drawings thereof are deemed to be included in the scope of the present invention delineated in the following claims.

What is claimed is:

1. A method for producing a mapping tool, comprising:
   creating a remote motion database having a plurality of remote motion commands generated by a remote device;
   reading an input source motion mapping table from a game program, wherein the input source motion mapping table corresponds each of the remote motion commands to its respective input source command of an input source;

resolving the input source commands and a plurality of motion commands included in the input source motion mapping table;
searching for the corresponding remote motion commands based on the motion commands; and
linking the remote motion commands with the corresponding input source commands of the input source to produce the mapping tool.

2. The method as claimed in claim 1, wherein the input source is a keyboard, a computer mouse, a joystick, a steering wheel controller, a touch screen or a gamepad, the input source motion mapping table is a keyboard motion mapping table, a computer mouse motion mapping table, a joystick motion mapping table, a steering wheel controller motion mapping table, a touch screen motion mapping table or a gamepad motion mapping table, and the input source command is a keyboard command, a computer mouse command, a joystick command, a steering wheel controller command, a touch screen command or a gamepad command, correspondingly and respectively.

3. The method as claimed in claim 1, wherein the game program is a PC game or a video game for a stand-alone computer.

4. The method as claimed in claim 1, wherein the remote device generating remote motion commands in terms of a plurality of remote motion signals and transmitting the remote motion signals to a wireless reception device of a host, and the host having the wireless reception device prepares a remote motion data base.

5. The method as claimed in claim 4, wherein the remote device comprises: an inertia sensing module, a sensing signal operation unit, and a wireless transmission module, and the wireless transmission module transmitting wirelessly the remote motion signal to the wireless reception device.

6. A game system for a stand-alone computer, comprising:
an input source; and
a mapping tool, the mapping tool, comprising:
a remote motion database having a plurality of remote motion commands generated by a remote device;
an input source motion mapping table; and
a game program, the input source motion mapping table is read from the game program, wherein the input source motion mapping table corresponds each of the remote motion commands to its respective input source command of the input source, the input source commands and a plurality of motion commands included in the input source motion mapping table are resolved; the corresponding remote motion commands based on the motion commands are searched for; and the remote motion commands with the corresponding input source commands of the input source are linked to produce the mapping tool.

7. The game system for the stand-alone computer according to claim 6, further comprising a host, having a wireless reception device and at least one game program, and a remote device, generating remote motion commands in terms of a plurality of remote motion signals and transmitting the remote motion signals to the wireless reception device for the host having the wireless reception device to prepare a remote motion data base; and the mapping tool stored in the host, having a remote motion resolution section and a remote motion mapping table, the remote motion resolution section being used to resolve the remote motion signals, and to generate the remote motion mapping table based on resolving the remote motion signals, so that the remote device controls the game program in accordance with the remote motion mapping table.

8. The game system for the stand-alone computer according to claim 6, wherein the input source motion mapping table corresponds each of the motion commands of the game program to its respective input source command.

9. The game system for the stand-alone computer according to claim 6, wherein the remote device comprises:
an inertia sensing module, used to sense an acceleration and an angular speed of the remote device;
a sensing signal operation unit, receiving information of the acceleration and the angular speed of the remote device; and
a wireless transmission module, transmitting wirelessly the remote motion signal to the wireless reception device.

10. The game system for the stand-alone computer according to claim 9, wherein the inertia sensing module comprises at least one accelerometer or at least one gyroscope.

11. The game system for the stand-alone computer according to claim 6, wherein the input source is a keyboard, a computer mouse, a joystick, a steering wheel controller, a touch screen or a gamepad, the input source motion mapping table is a keyboard motion mapping table, a computer mouse motion mapping table, a joystick motion mapping table, a steering wheel controller motion mapping table, a touch screen motion mapping table or a gamepad motion mapping table, and the input source command is a keyboard command, a computer mouse command, a joystick command, a steering wheel controller command, a touch screen command or a gamepad command, correspondingly and respectively.

12. The game system for the stand-alone computer according to claim 6, wherein the stand-alone computer is a PC.

13. The game system for the stand-alone computer according to claim 6, wherein the mapping tool searches for the motion command of the game program equivalent to the remote motion signal in the input source motion mapping table based on resolving the remote motion signal, in order to acquire the corresponding input source commands based on the input source motion mapping table, before linking the remote motion signal with the acquired input source command.

14. A game operation method using the mapping tool according to claim 1, comprising:
loading the game program having the input source motion mapping table;
installing the mapping tool; receiving the remote motion signals;
resolving the remote motion commands generated by the remote device through the mapping tool;
separating an input source command signal in the input source motion mapping table by means of the mapping tool; and
linking the remote motion signals with the input source command signals.

15. The game operation method according to claim 14, wherein the input source motion mapping table corresponds each of the remote motion commands of the game program to the input source command associated with the input source command signal.

16. The game operation method according to claim 14, wherein the step of linking the remote motion signals with the input source command signals further comprises simulating the input source command signal based on the remote motion commands.

* * * * *